(12) United States Patent
Finn

(10) Patent No.: US 8,850,015 B2
(45) Date of Patent: Sep. 30, 2014

(54) NETWORK-NETWORK INTERFACE

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 13/014,610

(22) Filed: Jan. 26, 2011

(65) Prior Publication Data

US 2011/0185067 A1 Jul. 28, 2011

Related U.S. Application Data

(60) Provisional application No. 61/298,455, filed on Jan. 26, 2010.

(51) Int. Cl.
*G06F 15/173* (2006.01)
*H04L 12/857* (2013.01)
*H04L 12/803* (2013.01)

(52) U.S. Cl.
CPC .......... *H04L 47/2491* (2013.01); *H04L 47/125* (2013.01)
USPC ............................ 709/226; 709/223; 709/225

(58) Field of Classification Search
CPC .......................... H04L 47/125; H04L 47/2491
USPC ......................................... 709/223, 225, 226
See application file for complete search history.

(56) References Cited

U.S. PATENT DOCUMENTS 6,094,431 A * 7/2000 Yamato et al. ............ 370/395.21
6,944,166 B1 * 9/2005 Perinpanathan et al. ..... 370/401
7,877,495 B2 * 1/2011 Stevens et al. ................ 709/229
8,265,676 B2 * 9/2012 Omar ............................ 455/509
2005/0160171 A1 * 7/2005 Rabie et al. ................... 709/227
2009/0296700 A1 * 12/2009 Stevens et al. ................ 370/389
2010/0226368 A1 * 9/2010 Mack-Crane et al. ........ 370/390
2012/0063314 A1 * 3/2012 Pignataro et al. ............. 370/235

OTHER PUBLICATIONS

Atlas, A., Ed., Zinin, A., Ed., "Basic Specification for IP Fast Reroute: Loop-Free Alternates", RFC 5286, Sep. 2008, http://www.ietf.org/rfc/rfc5286.txt.

Finn, Norman, "A framework for defining an IEEE 802.1 NNI", presentation to IEEE 802.1, Jan. 2010, http://www.ieee802.org/1/files/public/docs2010/new-nfinn-nni-framework-0110-v01.pdf.

Haddock, Stephen, "E-NNI Redundancy", presentation to IEEE 802.1, Nov. 2009, http://www.ieee802.org/1/files/public/docs2009/new-haddock-ENNI-redundancy-1109-v1.pdf.

Lasserre, M. (Ed.) and Kompella, V. (Ed.), IETF RFC 4762, "Virtual Private LAN Service (VPLS) Using Label Distribution Protocol (LDP) Signaling", http://www.rfc-editor.org/rfc/rfc4762.txt, Jan. 2007.

(Continued)

*Primary Examiner* — Mohamed Wasel
(74) *Attorney, Agent, or Firm* — Baker Botts L.L.P.

(57) ABSTRACT

In one embodiment, a method includes receiving at a first portal of a first node data for communication from a first network to a second network that belong to a particular one of a first set of service classes of the first network; determining at the first portal a particular one of a second set of service classes of the second network for the data; and directing the data from the first portal to a second portal of a second node residing at least in part in the second network.

22 Claims, 5 Drawing Sheets

(56) References Cited

OTHER PUBLICATIONS

Metro Ethernet Forum MEF 10.2, "Ethernet Services Attributes Phase 2 (Oct. 2009)", http://www.metroethernetforum.org/PDF_Documents/technical-specifications/MEF10.2.pdf.

Nadeau, T. and R. Aggarwal, "Pseudo Wire Virtual Circuit Connectivity Verification (VCCV)", RFC 5085, Dec. 2007, http://www.ietf.org/rfc/rfc5085.txt.

IEEE Std™ 802.1Q-2005, "Virtual Bridged Local Area Networks", http://standards.ieee.org/getieee802/download/802.1Q-2005.pdf, May 19, 2006.

IEEE Std™ 802.1ad-2005, "Virtual Bridged Local Area Networks Amendment: Provider Bridges", http://standards.ieee.org/getieee802/download/802.1ad-2005.pdf, May 26, 2006.

IEEE Std™ 802.1ag-2007, "Virtual Bridged Local Area Networks Amendment: Connectivity Fault Management", http://standards.ieee.org/getieee802/download/802.1ag-2007.pdf, Dec. 17, 2007.

IEEE Std™ 802.1ah-2008, "Virtual Bridged Local Area Networks Amendment: Provider Backbone Bridges", http://standards.ieee.org/getieee802/download/802.1ah-2008.pdf. Aug. 14, 2008.

IEEE Std™ 802.1Qay-2009, "Virtual Bridged Local Area Networks Amendment: Provider Backbone Bridge Traffic Engineering", http://standards.ieee.org/getieee802/download/802.1Qay-2009.pdf, Aug. 5, 2009.

IEEE Std™ 802.1X-2010, "Port-based Network Access Control", http://standards.ieee.org/getieee802/download/802.1X-2010.pdf, Feb. 5, 2010.

IEEE Std™ 802.1AB-2009, "Station and Media Access Control Connectivity Discovery", http://standards.ieee.org/getieee802/download/802.1AB-2009.pdf, Sep. 17, 2009.

IEEE Std™ 802.1ag-2007, "Connectivity Fault Management", http://standards.ieee.org/getieee802/download/802.1ag-2007.pdf, Dec. 17, 2007.

IEEE Std™ 802.3-2005, "Carrier sense multiple access with collision detection (CSMA/CD) access method and physical layer specifications", Clause 43 Link Aggregation, http://standards.ieee.org/getieee802/download/802.3-2005_section1.pdf, Dec. 9, 2005.

IEEE Std™ 802.1ak-2007, "Virtual Bridged Local Area Networks Amendment: Multiple Registration Protocol", http://standards.ieee.org/getieee802/download/802.1ak-2007.pdf, Jun. 22, 2007.

IETF RFC 2863 (Draft standard), "The Interfaces Group MIB", http://www.ietf.org/rfc/rfc2863.txt, Jun. 200.

IETF RFC 5556, "Transparent Interconnection of Lots of Links (TRILL): Problem and Applicability Statement", http://www.ietf.org/rfc/rfc5556.txt, May 2009.

ITU-T Recommendation Y.1731(2008), "OAM functions and mechanisms for Ethernet based networks", http://www.itu.int/rec/T-REC-Y.1731-200802-I/en, 2008.

ITU-T G.8032//Y.1344 "Ethernet Ring Protection Switching (Prepublished)", http://www.itu.int/rec/T-REC-G.8032/en, 2008.

* cited by examiner

NETWORK-NETWORK INTERFACE

RELATED APPLICATION

This application claims the benefit, under 35 U.S.C. §119 (e), of U.S. Provisional Patent Application No. 61/298,455, filed 26 Jan. 2010, which is incorporated herein by reference.

TECHNICAL FIELD

This disclosure generally relates to the use of buffer networks in network-to-network interfaces.

BACKGROUND

Separate providers' networks, commonly referred to as "clouds" are interconnected via Network Network Interfaces (NNIs) to create networks spanning vast geographic areas, so that providers may offer services that cannot be offered by any single provider. In order to achieve the fastest reaction to node or link failures, some form of protection switching is common. Buffer networks are networks whose physical topology, configuration enable it to guarantee, even in the face of some number of node or link failures, to proved connectivity among all of its NNIs.

DESCRIPTION OF EXAMPLE EMBODIMENTS

Overview

Figure 1:
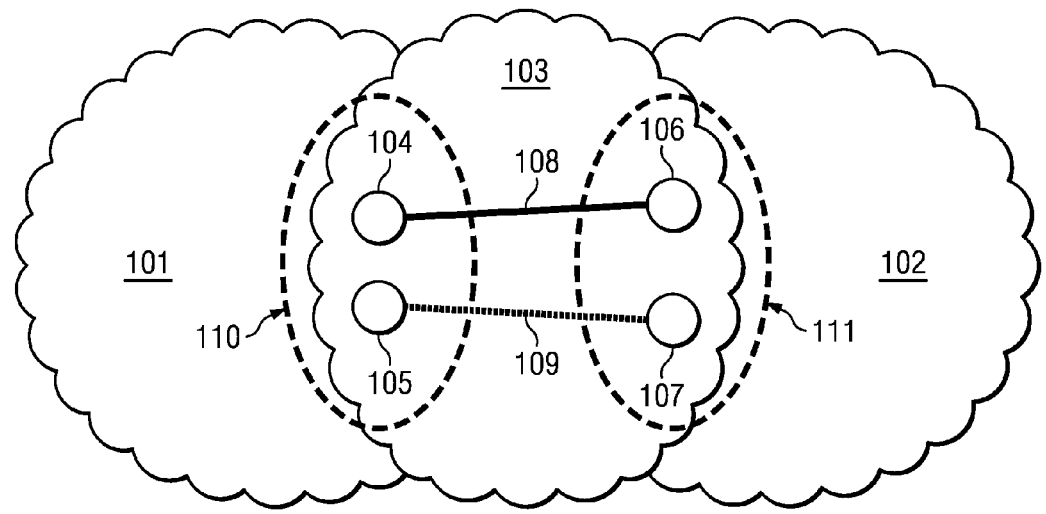
FIG. 1 illustrates an example NNI.

In one embodiment, a method includes receiving at a first portal of a first node data for communication from a first network to a second network that belong to a particular one of a first set of service classes of the first network. The first node resides at least in part in the first network and includes a first edge and the first portal. The first edge includes a logical or physical partition of the first node configured to provide network resources for the first network. The first portal includes a logical or physical partition of the first node configured to provide network resources for a buffer network between and logically or physically separate from the first and second networks. The first node terminates in the first network one of two or more links between the first network and the second network. The buffer network includes two or more of the links between the first and second network. The method also includes determining at the first portal a particular one of a second set of service classes of the second network for the data. The method also includes directing the data from the first portal to a second portal of a second node residing at least in part in the second network. The second node includes a second edge and the second portal. The second edge includes a logical or physical partition of the second node configured to provide network resources for the second network. The second portal includes a logical or physical partition of the second node configured to provide network resources for the buffer network. The second portal of the second node is designated to carry into the second network through the second edge data belonging to the particular one of the second set of service classes.

In another embodiment, a method includes, for each of two or more links connecting a first network and a second network with each other, identifying a first node terminating the link in the first network and a second node terminating the link in the second network. The first network has a first set of service classes and the second network has a second set of service classes. The method also includes, for each of the first and second nodes, identifying: an edge that includes a first logical or physical partition of the first or second node configured to provide first network resources for the first or second network; and a portal that includes a second logical or physical partition of the first or second node configured to provide second network resources for a buffer network between the first and second network. The buffer network includes two or more of the links between the first and second network. The method also includes establishing the buffer network with the portals. The buffer network is logically or physically separate from the first and second networks and is configured to receive at a portal of one of the first nodes data for communication from the first network to the second network that belong to a particular one of the first set of service classes; determine a particular one of the second set of service classes for the data; and direct the data to a particular one of the portals of a particular one of the second nodes that is designated to carry into the second network through its corresponding edge data belonging to the particular one of the second set of service classes.

DESCRIPTION OF EXAMPLE EMBODIMENTS

Service providers may require interfaces between their networks, called Network-Network Interfaces (NNIs), so that data transport services can be sold (jointly or by subcontract) that may not be offered by any single provider. For example, a service connecting Paris, Caracas, and San Diego may require the joint efforts of several providers. In particular embodiments, the problems in defining an NNI may relate to one or more of the following:

Different carriers may use different technologies for data transport, e.g., Internet Engineering Task Force Virtual Private Local Area Network Service (IETF VPLS) vs. Institute of Electrical and Electronics Engineers Medium Access Control-in-Medium Access Control (IEEE MAC-in-MAC), although some type of protection switching (such as, for example, path selection among pre-provisioned paths based on local knowledge of path continuity) may be assumed, because this may have the best fault recovery time.

Multiple nodes (such as, for example, routers, switches, or the like) redundant physical links are required of an NNI, in order to ensure connectivity and quality of service (QoS) of services against some number of failures of nodes or links.

It may be important that a failure recovery action (such as, for example, switching a service to an alternate node or path) in one provider's network not result in a change at or near the NNI that results in the neighboring network having to perform a failure recovery action, as this may result in a global chain of recovery actions. That is, in particular embodiments, faults in one network may need to be isolated from faults in another network.

Protection switching is usually provisioned so that a network guarantees the continuity, QoS, etc., of its services even in the event of a certain number of failures (such as, for example, one failure) of nodes or links in that network. In particular embodiments, it may be desired, when connecting two networks with an NNI, that the failure set (such as, for example, the set of nodes and links over which only N failures can be tolerated) does not become the union of the two networks. In particular embodiments, this may be another way of describing fault isolation.

In particular embodiments, there may be any number of schemes for NNIs, mostly based on particular transport technologies. However, these schemes may suffer from one of the following issues:

Serial fault isolation. In particular embodiments, in order to separate the failures of one network from another, one may place a single point of failure at the NNI. Each network provides multiple paths from NNI to NNI or end to NNI. In particular embodiments, if a fault occurs in one network, the data is still delivered to the next NNI, and the next network may not know of the fault, and so the networks may be isolated. But, in particular embodiments, a failure of any NNI may kill the service.

End-to-end pathing. In particular embodiments, to avoid the serial fault isolation problem, providers may provision two simple NNIs between each pair of providers. A point-to-point service that spans multiple servers may be provided with two end-to-end paths, each taking a different end-provider-NNI-provider-NNI-provider-end path. The endpoints may do simple circuit switching between the two paths. However, in particular embodiments, any NNI failure may cause its path to fail, so that the failure set becomes all of the NNIs in either path. In particular embodiments, this problem may not be serious for point-to-point services, but may be a severe problem for large multipoint-to-multipoint services. Furthermore, in particular embodiments, a failure of one NNI carrying m thousand services may trigger 2 m thousand fail-over events in end nodes, perhaps overstressing them. Finally, every service may require its own high-speed end-to-end service monitoring in order to detect and recover from a failure, creating a massive amount of monitoring traffic.

Assumption of impossibilities. In particular embodiments, in order to avoid the problems of non-redundant NNIs, while still providing the single points needed for serial fault isolation, various solutions (such as, for example, the CISCO Virtual Switch) may take multiple nodes in one network that simulate a single node. In particular embodiments, two such compound nodes may be interconnected with multiple links that simulate a single link. This may improve the reliability of the single-point-of-failure NNIs. However, in particular embodiments, all such schemes posit the existence of perfectly reliable links among the members of a compound node. Making ultra-reliable links may mean increased cost, and often may mean an increased chance of multiple node failures. Furthermore, if the links are physically shortened to improve link reliability, the chances of physical damage to both elements of a compound node may increase.

In particular embodiments, this disclosure may refer to a link, a node, a portal, a terminus, a cloud, and a NNI. In particular embodiments, a link may include a single physical link connecting two or more nodes. For example, a link may connect two nodes. In particular embodiments, a link may belong to two networks, but in that case, both ends may be in both networks, and any packet on that link may exit the link on the same network on which it entered. For example, a link may be physical or logical, and may belong to exactly one network, and a node in two networks may connect to another node in the same two networks with a single physical link that is two logical links, one in each network. In particular embodiments, a link may not interconnect two networks. In particular embodiments, a node may include a switch or router connected to other nodes via links, belonging to either one or two networks, and either zero or one portals. In particular embodiments, a portal may include a collection of one or more nodes, each of which may belong to the same two networks, and which may be configured together as a portal and known as such to each of the networks. For example, a portal may be shared by exactly two networks, at least one of which may be an NNI, not a cloud. In particular embodiments, a terminus may include the point at which a service makes the transition from one network to the other in a node in a portal. In particular embodiments, a cloud may include a service provider's network. The network may have links and nodes. In particular embodiments, any given node may belong to one portal, and thus may belong to a second network. In particular embodiments, there may be no assumptions about the data transport technology, routing technology (if any), or protection switching technology (if any) used by the cloud. For example, such considerations may be, by definition, opaque to the NNI. However, in particular embodiments, the cloud may provide certain guarantees, and may interact with the routing protocol(s) running the NNI.

In particular embodiments, a NNI may include a cloud that consists of exactly two portals, with all nodes in portals. For example, an NNI can thus connect together two clouds. In particular embodiments, the requirements for an NNI are a strict subset of the requirements for a cloud. In particular embodiments, some of the NNI's nodes belong to one cloud, and the rest belong to the other cloud. In particular embodiments, there can be links among the nodes of one portal that belong to the NNI, and there can be links between nodes belonging to different portals, also belonging to the NNI. In particular embodiments, the NNI runs a protection switching or routing protocol which may provide certain critical guarantees.

In particular embodiments, any number of clouds may be stitched together by NNIs. Chains of NNIs may be possible. A service can be configured as a path from endpoint to cloud to NNI to cloud to NNI (where "to cloud to NNI" may be repeated any suitable number of times) to cloud to endpoint. In particular embodiments, this may be perfectly equivalent to defining a service in terms of a linear chain portals. In particular embodiments, this may be applied in point-to-point services, or any other suitable services. In particular embodiments, a multipoint-to-multipoint service may be a tree of clouds and NNIs, or equivalently, a tree of portals.

In particular embodiments, this disclosure may enable one to provision a service as a "single" linear sequence (or tree) of clouds and NNIs (or portals), rather than as a set of multiple end-to-end paths, that may provide fault isolation in all three senses:

In particular embodiments, a failure in one cloud may trigger a recovery event only in its attached NNIs, and not in another cloud. A failure in an NNI may not trigger a recover event in any other network.

In particular embodiments, configuring a service across clouds and NNIs may not affect the failure set of the service.

In particular embodiments, a failure in one cloud may trigger large numbers of failover events in its directly attached NNIs, whose components are presumed to be designed to handle them, and not in other clouds or endpoints. For example, a failure in one cloud may trigger large numbers of failover events only in its directly attached NNIs.

In particular embodiments, the guarantees that a network can provide may be split into two classes, one for the cloud and one for the NNI. Furthermore, the interaction required between the clouds' routing protocols and the NNIs' routing protocols may be defined. In particular embodiments, aspects of this disclosure may be centered around the difference between the terminus and the portal.

In particular embodiments, a cloud may guarantee to provide continuity (and QoS, etc.) for each service, even in the event of some number of failures of nodes or links, from some terminus in each configured portal to some service in each other configured portal (and to any endpoints in the cloud). In particular embodiments, when responding to a failure, a cloud may have to move one or more termini from one node within a portal to another node within that same portal. For example, the cloud may control the assignment of termini to nodes within a portal.

In particular embodiments, an NNI may guarantee to provide connectivity for each service from terminus to terminus, even in the event of some number of failures of nodes or links or reassignment of termini to nodes by its attached clouds.

FIG. 1 illustrates an example NNI. Network clouds 101 and 102 are connected via NNI 103. Network 101 includes two terminal nodes, 102 and 103, connecting network 101 to network 102. Similarly, network 102 includes terminal nodes 104 and 105. Both networks 101 and 102 include multiple edge nodes (not shown) that are attached to one or more links to connect it to other nodes in the same network, but are not connected to any NNI links. Terminal node 102 is connected to terminal node 104 via network portal interface (NPI) 106, and similarly terminal node 103 is connected to terminal node 105 via NPI 107. In this example, NPIs are point-to-point links that connect two terminal nodes that belong to two different networks. Terminal nodes 102 and 103 are part of portal 108, and terminal nodes are part of portal 109. In this example, a portal is defined as a list of one or more NPIs and their attached terminal nodes. A portal is thus the means by which two networks can exchange data or control messages.

Figure 2:
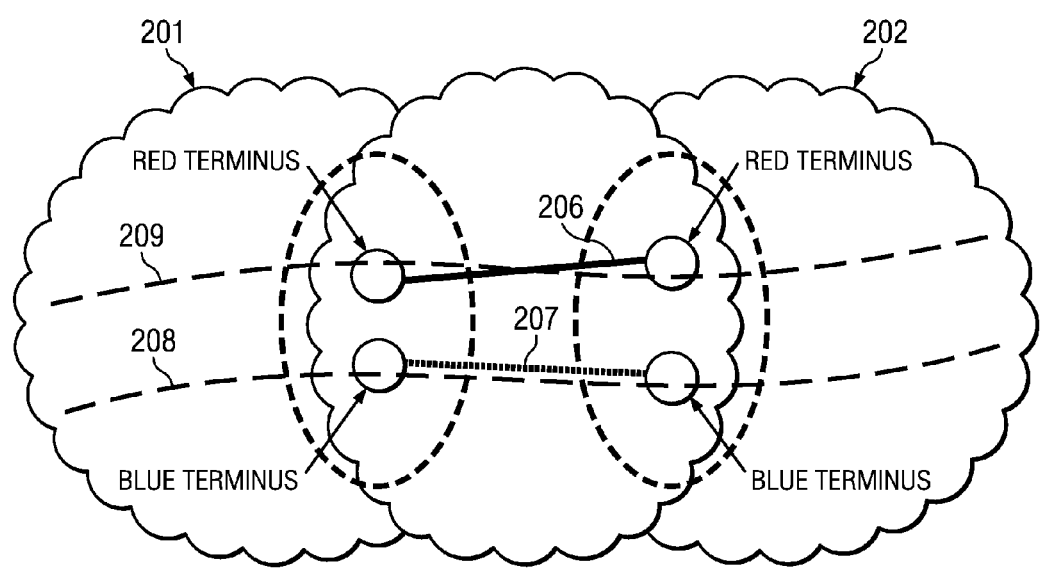
FIG. 2 illustrates an example of the problem arising from the simple form of protection switching using two pre-provisioned paths.

In FIG. 1, the four nodes with two links guarantee delivery from network 101 to network 102, even if one of NPIs 106 and 107 fail. In particular embodiments, protection switching (such as, for example, by IEEE methods like IEEE MAC-in-MAC, or IETF methods like IETF VPLS) may involve pre-provisioning a set of alternate paths among endpoints. In order to guarantee connectivity against any single failure in a network connecting N endpoints, N(N−1)/2 pre-provisioned paths may be required. In a network with P portals, each averaging D nodes per portal, $O((D \cdot P) \cdot X \cdot X \cdot 2)$ paths may be required. In particular embodiments, reducing the problem to saying that the cloud only has to interconnect portals 108 and 109, may result in a reduction to 2 paths, in this example, NPIs 106 and 107. However, the arrangement in FIG. 1 couples failures of a single NPI to both networks. FIG. 2 illustrates this problem.

FIG. 2 depicts the problem arising from the simple form of protection switching using two pre-provisioned paths. In particular embodiments, protection switching (such as, for example, by IEEE methods like IEEE MAC-in-MAC, or IETF methods like IETF VPLS) may involve pre-provisioning a set of alternate paths among endpoints. In order to guarantee connectivity against any single failure in a network connecting N endpoints, N(N−1)/2 pre-provisioned paths may be required. In a network with P portals, each averaging D nodes per portal, $O((D \cdot P) \cdot X \cdot X \cdot 2)$ paths may be required. In particular embodiments, reducing the problem to saying that the cloud only has to interconnect the portals, may result in a reduction to 2 paths. In particular embodiments, a network may consist of two perfectly parallel subnetworks, a red path, depicted as the dashed line 209 through network 201, NPI 206, and network 202, and a blue path, depicted as the dashed line 208 through network 201, NPI 207, and network 202. In particular embodiments, each portal has one red and one blue node. For example, if any failure occurs in red subnetwork 209 due to failure of NPI 206, entire subnetwork 209 may be discarded and blue network 208 may be used.

In particular embodiments, if all networks and NNIs were made this way, a failure of red network 209 in a cloud would trigger all services to shift to blue network 208. All services, both red and blue, would be routed through blue network 208 and NPI 207. However, the red terminus must change in both network cloud 201 and network cloud 202. Accordingly, this may require the adjacent NNI to use only its blue network, and this would ripple through until all networks were using only the blue half. In particular embodiments, there would be no fault isolation at all.

Figure 3:
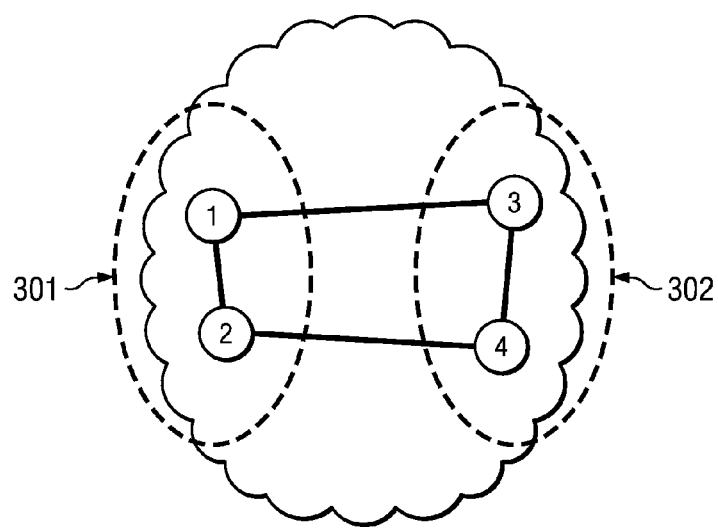
FIG. 3 illustrates an example NNI using buffer network insertion that avoids the change in terminus through fault isolation.

FIG. 3 depicts an example NNI using buffer network insertion that avoids the change in terminus through fault isolation. Portal 301 includes terminal nodes 1 and 2, and portal 302 includes terminal nodes 3 and 4. The arrangement is identical to that of FIGS. 1 and 2, however, in FIG. 3, network portals 301 and 302 include intra-network links 1-2 and 3-4 available for use solely by the NNI. In particular embodiments, intra-network links 1-2 and 3-4 are real links. In particular embodiments, intra-network links 1-2 and 3-4 are virtual links. The example NNI interconnect of FIG. 3 provides eight protected segments: 1-3, 1-2-4-3, 1-3-4, 1-2-4, 2-4, 2-1-3-4, 2-1-3, and 2-4-3. Therefore, the interconnect can provide protection against any link failure without triggering an unnecessary change of terminus in either cloud. However, under this arrangement, the number of links grows exponentially.

In an NNI, $O((D \cdot P) \cdot X \cdot X \cdot 2)$ paths may be required to guarantee connectivity among all nodes. In particular embodiments, P=2, and there are no terminal nodes to account for. So, the number of paths can be quite manageable (such as, for example, 8 for two nodes per portal). In particular embodiments, reassigning termini may be an added complexity; when the left cloud reassigns a terminus to another node, this fact may be signaled to the nodes in the other portal, so that they can switch paths. In particular embodiments, this may not increase the number of required pre-provisioned paths, but may add the requirement for: (a) a terminus-moved signal to be used by the NNI's routing protocol; and (b) a means for the cloud's routing protocol to signal the terminus change to the NNI's routing protocol. Clearly, this may take some small additional time, but that may be as far as the chain of consequences from a fault recovery action can go. In particular embodiments, this may result in a requirement being put on the NNI that has a very high per-node cost and a high interconnectivity requirement, but may restrict the NNI to a small number of nodes, so that cost is not too high. Furthermore, a greatly relaxed requirement may be put on the NNI, which it can meet in spite of having a large number of portals. In particular embodiments, the NNIs may serve as "fault insulators" between the clouds.

In particular embodiments, large complex provider networks running relatively cheap fault recovery protocols (clouds) may be interconnected using small, simple networks running relatively expensive fault recovery protocols (NNIs) by introducing the ability of the cloud to move the cloud/NNI handover point (terminus) from one network node to another. In particular embodiments, this may allow a service to span a global network of provider clouds with all the advantages of fault isolation, but without the issues inherent in constructing alternative end-to-end multi-network paths.

Figure 4:
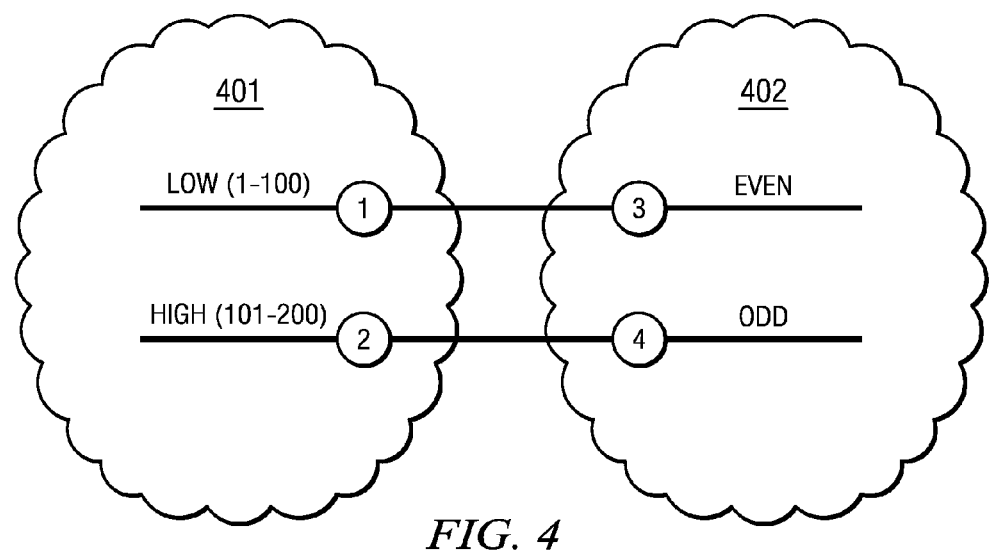
FIG. 4 illustrates a bundling reconciliation problem that commonly arises when connecting two networks via a NNI.

FIG. 4 illustrates a bundling reconciliation problem that commonly arises when connecting two networks via a NNI. In particular embodiments, owners of a cloud may wish to group one or more services together by configuration, called a bundle, that share the same fate with regard to fault protection. These bundles are a control plane construct whose purpose is to reduce signal costs. For example, in FIG. 4, network cloud 401 with a first network owner, numbers each unique data service with a service number, and decides to route all data services with low numbers (1-100) to terminal node 1, and all data services with high numbers (101-200) to terminal node 2. However, the owner of network cloud 402 has implemented a bundling policy wherein all even-numbered data services are routed through terminal node 3, and odd-numbered data services are routed through terminal node 4. In such a case, the bundles of data simply cannot be reconciled without cooperation between the network operators who administer network clouds 401 and 402. Even if virtual links 1-2 and 3-4 are utilized as in FIG. 3, the network operators must be aware of the bundling policies of each network it is connected to, resulting in a significant burden for network operators, particularly in large multi-point networks. This problem is exacerbated if a network node or link fails in either network.

Figure 5:
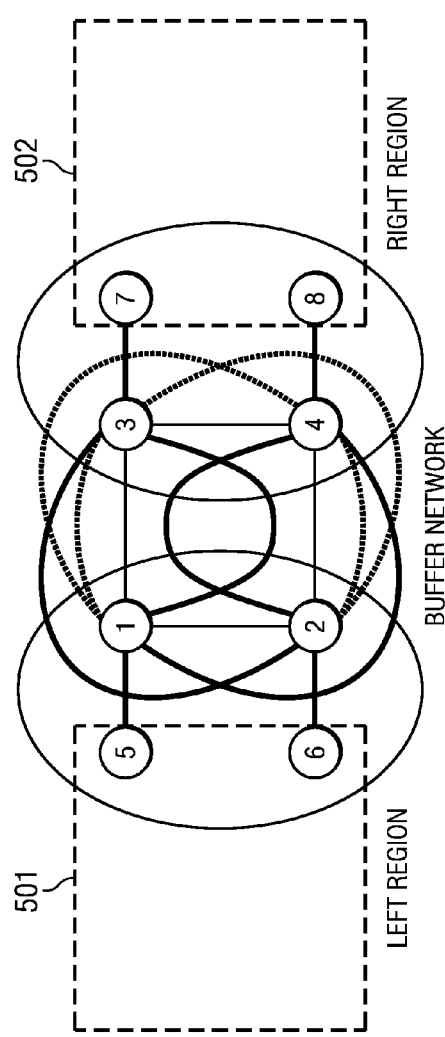
FIG. 5 depicts an example NNI joining two networks using buffer network insertion.

FIG. 5 depicts an example NNI joining two networks using buffer network insertion. In this example, a protection-switched buffer network is created between Network 501 and Network 502 by partitioning each terminal node into two portions, an edge node and a portal node. For example, terminal node 1 is logically partitioned into portal node 1 and edge node 5. Edge nodes 5 and 6 operate as normal nodes within network 501, and edge nodes 7 and 8 operate as normal nodes within network 502. However, portal nodes 1, 2, and 3, 4, although physically residing within networks 501 and 502, respectively, operate as part of a buffer network. In order to account for any single link or node failure, eight segments are required: 1-3, 1-2-4-3, 1-3-4, 1-2-4, 2-1-3, 2-4-3, 2-1-3-4, and 2-4. This set provides an active segment and a standby segment between each pair of portal nodes residing in different portals, 1-3, 1-4, 2-3, and 2-4. Thus there is a protection switching base within the protection-switched buffer network.

Figure 6:
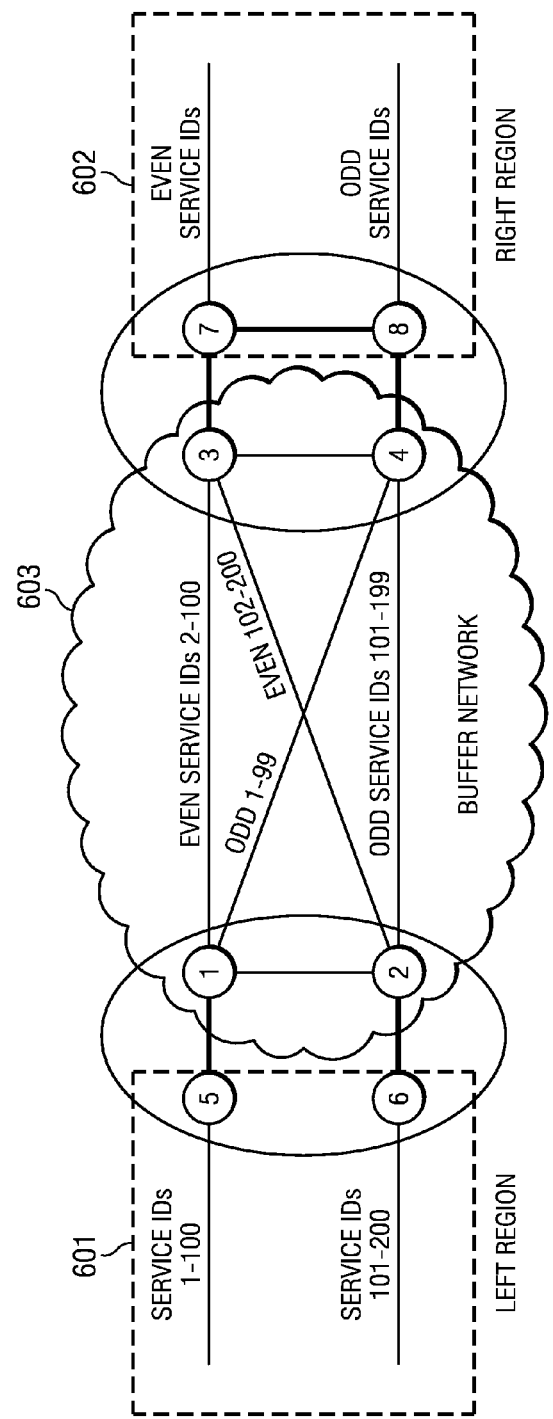
FIG. 6 depicts an example of a network solving the bundling reconciliation problem of FIG. 4 through implementation of a buffer network 603.

FIG. 6 depicts an example of a network solving the bundling reconciliation problem of FIG. 4 through implementation of a buffer network 603. Because network 601 requires bundling of services into two groups, low (1-100) and high (101-200), and network 602 requires bundling into two groups, even and odd), buffer network 603 must implement four distinct bundles: even-low along the 1-3 path, odd-low along the 1-4 path, even-high along the 2-3 path, and odd-high along the 2-4 path. This is necessary so that a data packet received on the NNI selected by one of the networks can enter the other network on the correct NNI, as selected by that other network. Depending on other factors, buffer network 603 may choose to subdivide the services into even more bundles. For example, if the 2-4 link were omitted from the diagram, buffer network 603 would still be able to meet all of its guarantees, but it might want to divide the services into three groups with more-or-less equal bandwidth requirements. To achieve both even load balancing over the three links, while accommodating the NNI reassignments by the networks, it might want to define 12 bundles.

In particular embodiments, the routing mechanism added by buffer network 603 is the ability of a portal node in buffer network 603 to be told by the adjacent network that the NNI connecting them is not the preferred NNI for a bundle of services, and for that information to be relayed to other portals, so that all involved portal nodes can change segments. For example, if a bundle is using the 4-8 NNI (odd-numbered services), and for reasons not apparent to any node in buffer network 603, network 602 elects to move that bundle to the 3-7 NNI (perhaps due to failure or congestion). Whether network 602 notifies portal node 3 that its NNI is the new choice, or whether it notifies portal node 4 of that fact, or both notifications take place, node 3 or node 4 (or both) must somehow inform node 1 and node 2 of that change. Each bundle moved in network 602 can affect a number of bundles in buffer network 603.

In particular embodiments, a portal node can multicast a notification in the data plane to all portal nodes in buffer network 603 through one or more control paths reserved for that purpose, and repeat it to ensure delivery. In particular embodiments, each portal node could flood frequent updates, either in the data plane or hop-by-hop through portal nodes, giving its opinion of all bundle-NNI bindings. In particular embodiments, some combination of techniques, to ensure both long-term synchrony of the NNI-bundle information, and provide fast fault reaction, such as hop-by-hop updates, along with the data plane multicasts of events.

In particular embodiments, each node in buffer network 603 exchanges connectivity check messages with all other nodes in buffer network 603. The connectivity check messages allow each node to know the state of each segment, so that every node is aware when a segment has failed. In particular embodiments, the connectivity check messages (CCMs) used to diagnose the connectivity of buffer network 603's segments carry information about NNI usage.

In particular embodiments, fault recovery reconciliation is solved by providing a mechanism for networks to make NNI primitives for communication between buffer networks and networks. In particular embodiments, failure propagation is limited in that, although failure in a network can cause that network to alter NNI assignment within one or more portals, and thus cause a recovery action in the adjacent buffer network, those buffer networks cannot propagate the failure action any further, because they cannot alter the NNI assignments. In particular embodiments, the use of buffer network 603 allows each network to decide how to apportion bundles of services to an NNI within each portal and forcing buffer network 603 to rebundle services so that each service in a buffer network bundle is the same bundle in each of the attached networks. In particular embodiments, buffer network 603 is jointly managed by network providers providing network 601 and 602. In particular embodiments, buffer network 603 obtains its NNI bundlings from networks 601 and 602 themselves. In particular embodiments, buffer network 603 is managed by only one of the network owners providing networks 601 and 602.

Figure 7:
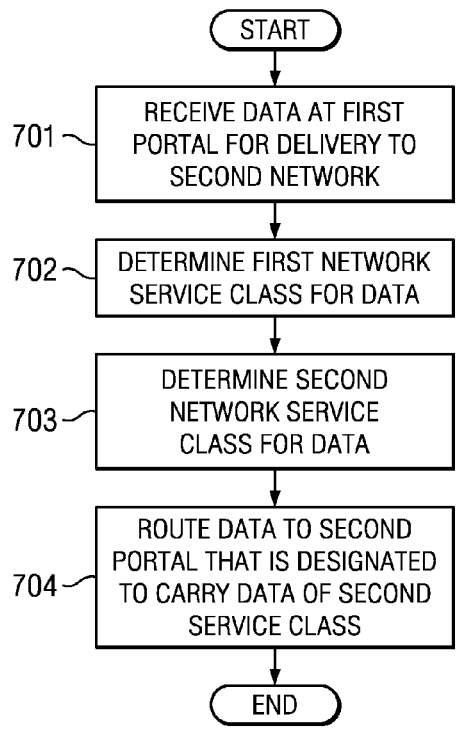
FIG. 7 illustrates an example method for providing an NNI.

FIG. 7 illustrates an example method for providing an NNI. The method may start at step 701, where data passes from an edge node within a first network to a first portal node logically separate from the edge node within a buffer network. At step 702, the first portal node determines the first network service class of the data, for example, if the data is stamped with a service ID number, and the first portal node determines from its corresponding edge node that all data with even service ID numbers are routed through the edge node. At step 703, the first portal node determines the second network service class of the data. In particular embodiments, the first portal node may be preconfigured with the bundling preferences of the second network. In particular embodiments, the first portal node obtains this data from querying the second network. In particular embodiments, the bundling preferences of the second network are transmitted through connectivity messages. At step 704, the first portal node routes the data to a second portal in a second node in the second network that is designated to receive traffic of the data's second network service class, at which point the method may end. The data is routed from the first portal to the second portal through the buffer network. In particular embodiments, the routing is performed based on a load balancing algorithm. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components carrying out particular steps of the method of FIG. 7, this disclosure contemplates any suitable combination of any suitable components carrying out any suitable steps of the method of FIG. 7.

Figure 8:
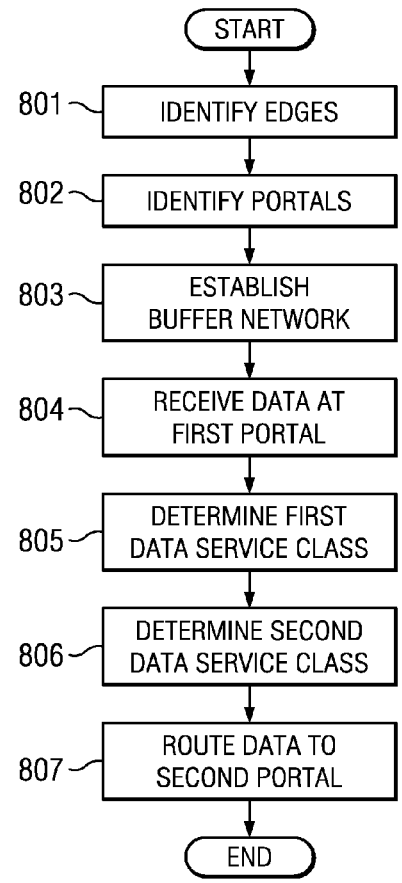
FIG. 8 illustrates another example method for providing an NNI.

FIG. 8 illustrates another example method for providing an NNI. The method may start at step 801, where the system identifies the edges for each node that is linked to another node in another network; the edges comprising a first logical or physical partition of the first or second node configured to provide first network resources for the first or second network. At step 802, the system identifies the portals comprising a second logical or physical partition of the first or second node configured to provide second network resources for a buffer network between the first and second network. At step 803, the system establishes the buffer network by logically or physically partitioning the terminal nodes each into edge and portal nodes. The buffer network being logically or physically separate from the first and second networks. Having established the buffer network, at step 804, data is received at a first portal destined for a node in the second network. At step 805, the first portal determines the first network service class for the data. For example, if the data is stamped with a service ID number, and the first portal node determines from its corresponding edge node that all data with even service ID numbers are routed through the edge node. At step 806, the first portal determines the second network service class for the data. For example, if the second network routes all data with high numbers to a particular portal, and all data with low numbers to a different particular portal, then the portal node determines the route for both even-high data and even-low data. At step 807, the first portal routes the data a second portal, the second portal being part of a second dnode that is designated to receive traffic of the data's second network service class. In particular embodiments, the routing is performed based on a load balancing algorithm. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components carrying out particular steps of the method of FIG. 8, this disclosure contemplates any suitable combination of any suitable components carrying out any suitable steps of the method of FIG. 8.

Figure 9:
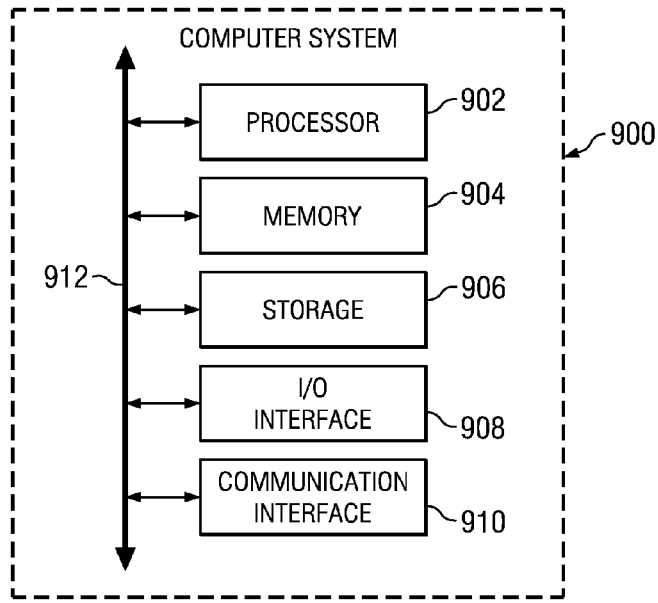
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple datacenters; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 02 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 10:
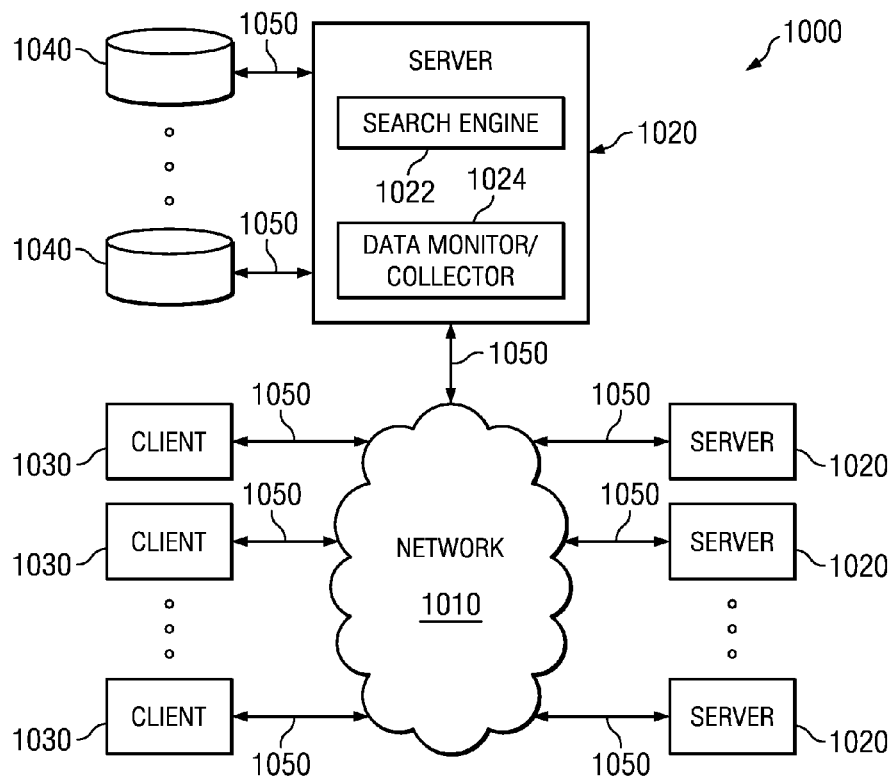
FIG. 10 illustrates an example network environment.

FIG. 10 illustrates an example network environment 1000. This disclosure contemplates any suitable network environment 1000. As an example and not by way of limitation, although this disclosure describes and illustrates a network environment 1000 that implements a client-server model, this disclosure contemplates one or more portions of a network environment 1000 being peer-to-peer, where appropriate. Particular embodiments may operate in whole or in part in one or more network environments 1000. In particular embodiments, one or more elements of network environment 1000 provide functionality described or illustrated herein. Particular embodiments include one or more portions of network environment 1000. Network environment 1000 includes a network 1010 coupling one or more servers 1020 and one or more clients 1030 to each other. This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 couple servers 1020 and clients 1030 to network 1010 or to each other. This disclosure contemplates any suitable links 1050. As an example and not by way of limitation, one or more links 1050 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 1050. In particular embodiments, one or more links 1050 each includes an intranet, an extranet, a VPN, a LAN, a WLAN, a WAN, a MAN, a communications network, a satellite network, a portion of the Internet, or another link 1050 or a combination of two or more such links 1050. Links 1050 need not necessarily be the same throughout network environment 1000. One or more first links 1050 may differ in one or more respects from one or more second links 1050.

This disclosure contemplates any suitable servers 1020. As an example and not by way of limitation, one or more servers 1020 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 1020 includes hardware, software, or both for providing the functionality of server 1020. As an example and not by way of limitation, a server 1020 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 1030, the web server may communicate one or more such files to client 1030. As another example, a server 1020 that operates as a mail server may be capable of providing e-mail services to one or more clients 1030. As another example, a server 1020 that operates as a database server may be capable of providing an interface for interacting with one or more data stores (such as, for example, data stores 10100 described below). Where appropriate, a server 1020 may include one or more servers 1020; be unitary or distributed; span multiple locations; span multiple machines; span multiple datacenters; or reside in a cloud, which may include one or more cloud components in one or more networks.

In particular embodiments, one or more links 1050 may couple a server 1020 to one or more data stores 1040. A data store 1040 may store any suitable information, and the contents of a data store 1040 may be organized in any suitable manner. As an example and not by way or limitation, the contents of a data store 1040 may be stored as a dimensional, flat, hierarchical, network, object-oriented, relational, XML, or other suitable database or a combination or two or more of these. A data store 1040 (or a server 1020 coupled to it) may include a database-management system or other hardware or software for managing the contents of data store 1040. The database-management system may perform read and write operations, delete or erase data, perform data deduplication, query or search the contents of data store 1040, or provide other access to data store 1040.

In particular embodiments, one or more servers 1020 may each include one or more search engines 1022. A search engine 1022 may include hardware, software, or both for providing the functionality of search engine 1022. As an example and not by way of limitation, a search engine 1022 may implement one or more search algorithms to identify network resources in response to search queries received at search engine 1022, one or more ranking algorithms to rank identified network resources, or one or more summarization algorithms to summarize identified network resources. In particular embodiments, a ranking algorithm implemented by a search engine 1022 may use a machine-learned ranking formula, which the ranking algorithm may obtain automatically from a set of training data constructed from pairs of search queries and selected Uniform Resource Locators (URLs), where appropriate.

In particular embodiments, one or more servers 1020 may each include one or more data monitors/collectors 1024. A data monitor/collection 1024 may include hardware, software, or both for providing the functionality of data collector/collector 1024. As an example and not by way of limitation, a data monitor/collector 1024 at a server 1020 may monitor and collect network-traffic data at server 1020 and store the network-traffic data in one or more data stores 1040. In particular embodiments, server 1020 or another device may extract pairs of search queries and selected URLs from the network-traffic data, where appropriate.

This disclosure contemplates any suitable clients 1030. A client 1030 may enable a user at client 1030 to access or otherwise communicate with network 1010, servers 1020, or other clients 1030. As an example and not by way of limitation, a client 1030 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 1030 may be an electronic device including hardware, software, or both for providing the functionality of client 1030. As an example and not by way of limitation, a client 1030 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 1030 may include one or more clients 1030; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    receiving at a first portal of a first node data for communication from a first network to a second network that belong to a particular one of a first set of service classes of the first network, the first node residing at least in part in the first network and comprising a first edge and the first portal, the first edge comprising a logical or physical partition of the first node configured to provide network resources for the first network, the first portal comprising a logical or physical partition of the first node configured to provide network resources for a buffer network between and logically or physically separate from the first and second networks, the first node terminating in the first network one of two or more links between the first network and the second network;
    determining at the first portal a particular one of a second set of service classes of the second network for the data;
    directing the data from the first portal to a second portal of a second node residing at least in part in the second network, the second node comprising a second edge and the second portal, the second edge comprising a logical or physical partition of the second node configured to provide network resources for the second network, the second portal comprising a logical or physical partition of the second node configured to provide network resources for the buffer network, the second portal of the second node being designated to carry into the second network through the second edge data belonging to the particular one of the second set of service classes; and
    wherein the buffer network comprises:
        the first and second portals;
        a third portal associated with the first node;
        a fourth portal associated with the second node;

a first link directly connecting the first portal to the second portal;

a second link directly connecting the first portal to the third portal;

a third link directly connecting the second portal to the fourth portal; and a fourth link directly connecting the third portal to the fourth portal; and wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

2. The method of claim 1, the first portal directing the data based on a load-balancing algorithm.

3. The method of claim 1, further comprising:
at the first portal, determining a link status of each of the links in the buffer network; and
directing data from the first portal to one of the other portals based on the one or more of the link statuses.

4. The method of claim 3, wherein the link status of each of the links in the buffer network is determined by exchanging connectivity-check messages between the first portal and one or more other portals in the buffer network.

5. The method of claim 3, wherein directing data from the first portal to one of the other portals comprises directing traffic based on a load balancing algorithm.

6. A method comprising, by one or more computer systems:
for each of two or more links connecting a first network and a second network with each other, identifying a first node terminating the link in the first network and a second node terminating the link in the second network, the first network having a first set of service classes and the second network having a second set of service classes;
for each of the first and second nodes, identifying:
an edge comprising a first logical or physical partition of the first or second node configured to provide first network resources for the first or second network; and
a portal comprising a second logical or physical partition of the first or second node configured to provide second network resources for a buffer network between the first and second network; and
establishing the buffer network with the portals, the buffer network being logically or physically separate from the first and second networks and being configured to:
receive at a portal of one of the first nodes data for communication from the first network to the second network that belong to a particular one of the first set of service classes;
determine a particular one of the second set of service classes for the data; and
direct the data to a particular one of the portals of a particular one of the second nodes that is designated to carry into the second network through its corresponding edge data belonging to the particular one of the second set of service classes; and
wherein the buffer network comprises:
the first and second portals;
a third portal associated with the first node;
a fourth portal associated with the second node;
a first link directly connecting the first portal to the second portal;

a second link directly connecting the first portal to the third portal;

a third link directly connecting the second portal to the fourth portal; and a fourth link directly connecting the third portal to the fourth portal; and wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

7. The method of claim 6, wherein the buffer network is further configured to direct the data to a particular one of the portals of the second nodes based on a load-balancing algorithm.

8. The method of claim 6, further comprising:
determining a link status of each of the links in the buffer network; and
directing data from the portal of the first node to another one of the portals based on the determined link statuses.

9. The method of claim 8, wherein determining a link status of each of the links in the buffer network comprises exchanging connectivity-check messages between the portal of the first node and one or more other ones of the portals.

10. The method of claim 8, wherein directing data from the portal of the first node to the other one of the portals comprises directing traffic based on a load-balancing algorithm.

11. An apparatus comprising:
one or more communication interfaces;
one or more memory devices containing one or more instructions for execution by one or more processing devices; and
the processing devices, operable when executing the instructions to:
receive at a first portal of a first node data for communication from a first network to a second network that belong to a particular one of a first set of service classes of the first network, the first node residing at least in part in the first network and comprising a first edge and the first portal, the first edge comprising a logical or physical partition of the first node configured to provide network resources for the first network, the first portal comprising a logical or physical partition of the first node configured to provide network resources for a buffer network between and logically or physically separate from the first and second networks, the first node terminating in the first network one of two or more links between the first network and the second network;
determine a particular one of a second set of service classes of the second network for the data; and
direct the data from the first portal to a second portal of a second node residing at least in part in the second network, the second node comprising a second edge and the second portal, the second edge comprising a logical or physical partition of the second node configured to provide network resources for the second network, the second portal comprising a logical or physical partition of the second node configured to provide network resources for the buffer network, the second portal of the second node being designated to carry into the second network through the second edge data belonging to the particular one of the second set of service classes; and wherein the buffer network comprises:
the first and second portals;
a third portal associated with the first node;
a fourth portal associated with the second node;
a first link directly connecting the first portal to the second portal;
a second link directly connecting the first portal to the third portal;
a third link directly connecting the second portal to the fourth portal; and
a fourth link directly connecting the third portal to the fourth portal; and
wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

12. The apparatus of claim 11, the first portal directing the data based on a load balancing algorithm.

13. The apparatus of claim 11, the instructions further operable when executed by the processor devices to:
at the first portal, determine a link status of each of the links in the buffer network; and
direct data from the first portal to one of the other portals based on the one or more link statuses.

14. The apparatus of claim 13, wherein the link status of each of the links in the buffer network is determined by exchanging connectivity-check messages between the first portal and one or more other portals in the buffer network.

15. The apparatus of claim 13, wherein directing the data from the first portal to one of the other portals comprises directing traffic based on a load balancing algorithm.

16. An apparatus comprising:
one or more communication interfaces;
one or more memory devices containing one or more instructions for execution by one or more processing devices; and
the processing devices, operable when executing the instructions to:
for each of two or more links connecting a first network and a second network with each other, identify a first node terminating the link in the first network and a second node terminating the link in the second network, the first network having a first set of service classes and the second network having a second set of service classes;
for each of the first and second nodes, identify:
an edge comprising a first logical or physical partition of the first or second node configured to provide first network resources for the first or second network; and
a portal comprising a second logical or physical partition of the first or second node configured to provide second network resources for a buffer network between the first and second network; and
establish the buffer network with the portals, the buffer network being logically or physically separate from the first and second networks and being configured to:
receive at a portal of one of the first nodes data for communication from the first network to the second network that belong to a particular one of the first set of service classes;
determine a particular one of the second set of service classes for the data; and
direct the data to a particular one of the portals of a particular one of the second nodes that is designated to carry into the second network through its corresponding edge data belonging to the particular one of the second set of service classes; and
wherein the buffer network comprises:
the first and second portals;
a third portal associated with the first node;
a fourth portal associated with the second node;
a first link directly connecting the first portal to the second portal;
a second link directly connecting the first portal to the third portal;
a third link directly connecting the second portal to the fourth portal; and
a fourth link directly connecting the third portal to the fourth portal; and
wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

17. The apparatus of claim 16, wherein the buffer network is further configured to direct the data to a particular one of the portals of the second nodes based on a load-balancing algorithm.

18. The apparatus of claim 16, further operable to:
determine a link status for each of the links in the buffer network; and
the buffer network directing data to a particular one of the portals of a particular one of the second nodes based on the determined link statuses.

19. The apparatus of claim 18, wherein determining a link status of each of the links in the buffer network comprises exchanging connectivity-check messages between the portal of the first node and one or more other ones of the portals.

20. The apparatus of claim 18, wherein directing data from the portal of the first node to the other one of the portals comprises directing traffic based on a load-balancing algorithm.

21. One or more computer-readable non-transitory storage media embodying software that is operable when executed to:
receive at a first portal of a first node data for communication from a first network to a second network that belong to a particular one of a first set of service classes of the first network, the first node residing at least in part in the first network and comprising a first edge and the first portal, the first edge comprising a logical or physical partition of the first node configured to provide network resources for the first network, the first portal comprising a logical or physical partition of the first node configured to provide network resources for a buffer network between and logically or physically separate from the first and second networks, the first node terminating in the first network one of two or more links between the first network and the second network;
determine a particular one of a second set of service classes of the second network for the data;
direct the data from the first portal to a second portal of a second node residing at least in part in the second network, the second node comprising a second edge and the second portal, the second edge comprising a logical or physical partition of the second node configured to provide network resources for the second network, the second portal comprising a logical or physical partition of the second node configured to provide network resources for the buffer network, the second portal of the second node being designated to carry into the second network through the second edge data belonging to the particular one of the second set of service classes; and wherein the buffer network comprises:
  the first and second portals;
  a third portal associated with the first node;
  a fourth portal associated with the second node;
  a first link directly connecting the first portal to the second portal;
  a second link directly connecting the first portal to the third portal;
  a third link directly connecting the second portal to the fourth portal; and
  a fourth link directly connecting the third portal to the fourth portal; and wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

22. One or more computer-readable non-transitory storage media embodying software that is operable when executed to:

for each of two or more links connecting a first network and a second network with each other, identify a first node terminating the link in the first network and a second node terminating the link in the second network, the first network having a first set of service classes and the second network having a second set of service classes;

for each of the first and second nodes, identify:
  an edge comprising a first logical or physical partition of the first or second node configured to provide first network resources for the first or second network; and
  a portal comprising a second logical or physical partition of the first or second node configured to provide second network resources for a buffer network between the first and second network; and establish the buffer network with the portals, the buffer network being logically or physically separate from the first and second networks and being configured to:
  receive at a portal of one of the first nodes data for communication from the first network to the second network that belong to a particular one of the first set of service classes;
  determine a particular one of the second set of service classes for the data; and
  direct the data to a particular one of the portals of a particular one of the second nodes that is designated to carry into the second network through its corresponding edge data belonging to the particular one of the second set of service classes; and wherein the buffer network comprises:
  the first and second portals;
  a third portal associated with the first node;
  a fourth portal associated with the second node;
  a first link directly connecting the first portal to the second portal;
  a second link directly connecting the first portal to the third portal;
  a third link directly connecting the second portal to the fourth portal; and
  a fourth link directly connecting the third portal to the fourth portal; and wherein the first, second, third, and fourth portals are connected together by the first, second, third, and fourth links such that data received at any of the first, second, third, and fourth portals can reach any of the other of the first, second, third, and fourth portals when any one of the first, second, third, and fourth links is not operational.

* * * * *